US010860458B2

(12) United States Patent
Shani et al.

(10) Patent No.: US 10,860,458 B2
(45) Date of Patent: Dec. 8, 2020

(54) DETERMINING APPLICATION CHANGE SUCCESS RATINGS

(71) Applicant: HEWLETT PACKARD ENTERPRISE DEVELOPMENT LP, Houston, TX (US)

(72) Inventors: Inbar Shani, Yehud (IL); Gil Pearl, Yehud (IL); Amichai Nitsan, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 15/316,618

(22) PCT Filed: Jul. 31, 2014

(86) PCT No.: PCT/US2014/049024
§ 371 (c)(1),
(2) Date: Dec. 6, 2016

(87) PCT Pub. No.: WO2016/018333
PCT Pub. Date: Feb. 4, 2016

(65) Prior Publication Data
US 2017/0192875 A1    Jul. 6, 2017

(51) Int. Cl.
*G06F 11/36* (2006.01)
*G06F 11/30* (2006.01)
(Continued)

(52) U.S. Cl.
CPC ........ *G06F 11/3608* (2013.01); *G06F 11/302* (2013.01); *G06F 11/3428* (2013.01);
(Continued)

(58) Field of Classification Search
CPC .......... G06F 8/30; G06F 8/60–70; G06F 8/75; G06F 11/3604–3616; G06F 11/366;
(Continued)

(56) References Cited

U.S. PATENT DOCUMENTS 6,523,027 B1   2/2003  Underwood
6,832,236 B1  12/2004  Rick et al.
(Continued)

FOREIGN PATENT DOCUMENTS

CN          103235758 A      8/2013
WO     WO-2014027990 A1     2/2014
WO     WO-2014088398 A1     6/2014

OTHER PUBLICATIONS

Rothermel, G. et al., Prioritizing Test Cases for Regression Testing, IEEE Transactions on Software Engineering, vol. 27, No. 10, Oct. 2001, pp. 929-948, [retrieved on Jul. 18, 2020], Retrieved from the Internet.*
(Continued)

*Primary Examiner* — Geoffrey R St Leger

(57) ABSTRACT

In one example of the disclosure, a user-defined success criterion for an application change is received. The criterion is provided to a computing system associated with a developer-user of the application. Evaluation code, for evaluating implementation of the change according to the criterion, is received from the computing system. The evaluation code is caused to execute responsive to receipt of a notice of production deployment of the change. A success rating for the change is determined based upon application performance data attained via execution of the evaluation code.

20 Claims, 6 Drawing Sheets

(51) Int. Cl.
  *G06F 11/34* (2006.01)
  *G06F 8/65* (2018.01)
(52) U.S. Cl.
  CPC ...... *G06F 11/3612* (2013.01); *G06F 11/3616* (2013.01); *G06F 11/3664* (2013.01); *G06F 11/3688* (2013.01); *G06F 11/3692* (2013.01); *G06F 8/65* (2013.01)
(58) Field of Classification Search
  CPC ............ G06F 11/3668; G06F 11/3672; G06F 11/3692; G06F 11/3696; G06F 11/3664–3696
  USPC ................ 717/106–109, 120–121, 124–128, 717/130–133, 168–178
  See application file for complete search history.

(56) References Cited

U.S. PATENT DOCUMENTS

| | | | | |
|---|---|---|---|---|
| 7,165,241 | B2* | 1/2007 | Manda | G06F 11/3688 714/38.14 |
| 7,178,063 | B1* | 2/2007 | Smith | G06F 11/3688 714/38.1 |
| 7,437,614 | B2 | 10/2008 | Haswell et al. | |
| 7,480,602 | B2* | 1/2009 | Duffie | G06F 11/263 703/13 |
| 8,266,592 | B2* | 9/2012 | Beto | G06F 11/3688 717/124 |
| 8,572,679 | B1* | 10/2013 | Wang | G06F 8/65 726/1 |
| 8,842,125 | B2* | 9/2014 | Williams | G06T 1/00 345/501 |
| 8,856,725 | B1* | 10/2014 | Anderson | G06F 8/75 717/103 |
| 8,930,763 | B2* | 1/2015 | Funnell | G06F 11/3688 714/38.1 |
| 9,015,592 | B2* | 4/2015 | Gandhi | G06F 11/3688 715/733 |
| 9,448,913 | B2* | 9/2016 | Hoffmann | G06F 11/3612 |
| 2004/0103394 | A1* | 5/2004 | Manda | G06F 11/3688 717/126 |
| 2004/0143477 | A1 | 7/2004 | Wolff | |
| 2006/0161508 | A1* | 7/2006 | Duffie | G06F 11/263 706/55 |
| 2007/0156420 | A1 | 7/2007 | Meier et al. | |
| 2009/0265681 | A1* | 10/2009 | Beto | G06F 11/3672 717/100 |
| 2010/0005341 | A1 | 1/2010 | Agarwal et al. | |
| 2013/0080760 | A1 | 3/2013 | Li et al. | |
| 2013/0106880 | A1* | 5/2013 | Williams | G06T 1/00 345/522 |
| 2014/0201714 | A1 | 7/2014 | Vaidyan et al. | |
| 2015/0095892 | A1* | 4/2015 | Baggott | G06F 11/3612 717/127 |

OTHER PUBLICATIONS

Mei, L., et al., Preemptive Regression Test Scheduling Strategies: A New Testing Approach to Thriving on the Volatile Service Environments, IEEE 36th International Conference on Computer Software and Applications, 2012, pp. 72-81, [retrieved on Jul. 18, 2020], Retrieved from the Internet.*

International Search Report & Written Opinion received in PCT Application No. PCT/US2014/049024, dated Apr. 29, 2015, 11 pages.

Zhan, Z., "Practical Web Test Automation," Leanpub book, published May 12, 2014, 61 pages, available at http://samples.leanpub.com/practical_web_test_automation-sample.pdf.

* cited by examiner

FIG. 5A

Success Criterion for Application Feature Change:

More than 500 barcode searches each day for a week, starting one week after deployment

Application Feature Change Evaluation Script:

OnDeploy + [1w, 2w]: if Monitor(barcode_search_count).value<500 then fail

Success Rating for Application Feature Change:

Pass

506

US 10,860,458 B2

DETERMINING APPLICATION CHANGE SUCCESS RATINGS

BACKGROUND

Agile methodology and other modern rapid application development (RAD) methodologies emphasize a flexible process with iterative and incremental development. RAD processes typically utilize a number of cross-functional development teams and have an expectation that requirements and solutions will evolve throughout the development cycle. RAD is especially well suited (although not limited to) developing software that is driven by user interface requirements.

DRAWINGS

FIGS. 5A, 5B, and 5C are screenshots illustrating an example of determining application change success ratings.

Figure 6:
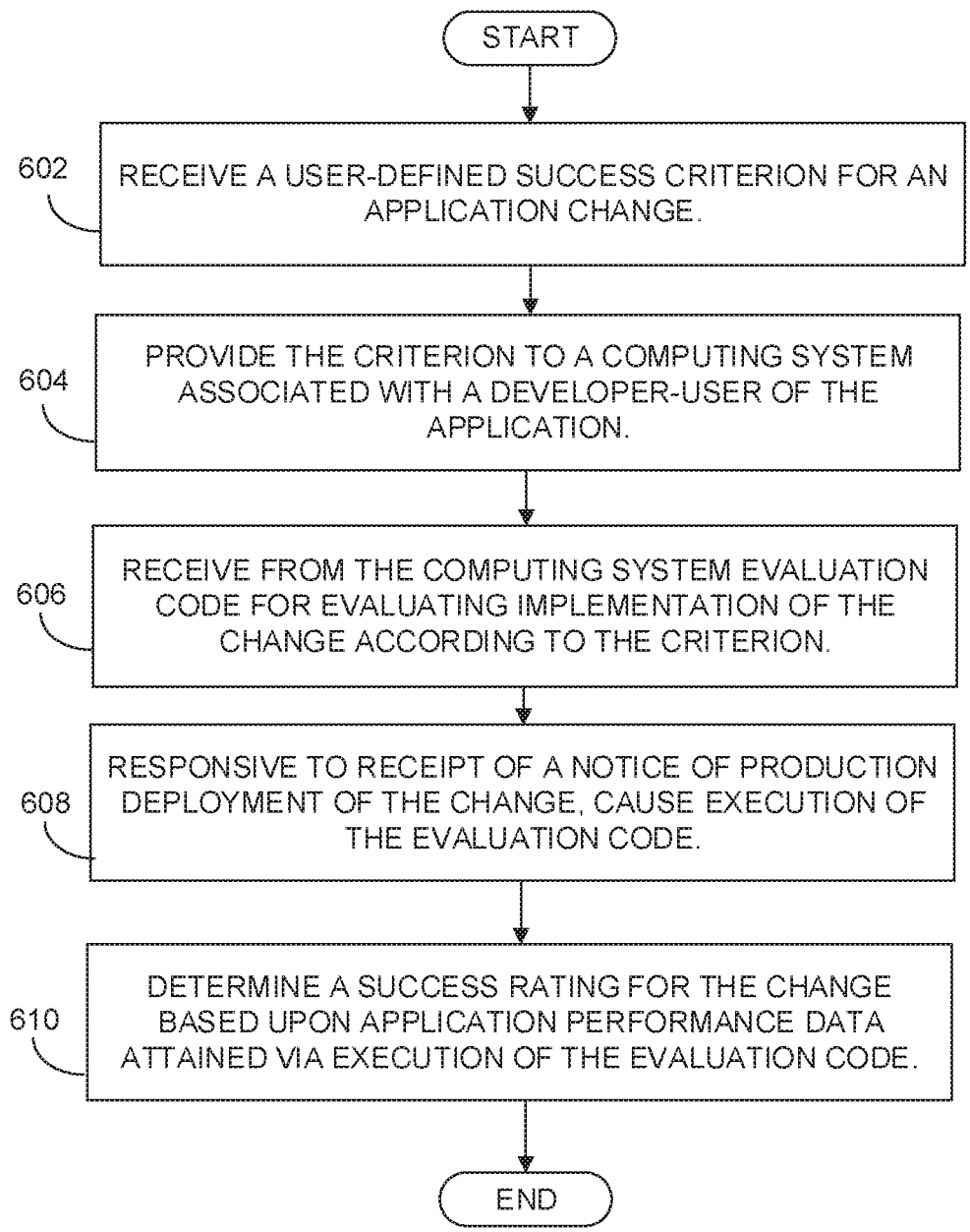

FIG. 6 is a flow diagram depicting steps taken to implement an example.

DETAILED DESCRIPTION

Introduction

Application development teams utilizing RAD processes are challenged to define measurable goals for suggested application changes, and then to track the achievement of these goals once the application change is delivered. Defining goals can be based on tracking feedback collected in production and from user reactions to the application change (e.g., collected via production monitoring and analysis). However, application development teams commonly do not have full access to, or a good understanding of, existing or possible production monitors. Further, application development teams may prefer to focus on the user perspective of the application change goals, rather than the technicalities of production monitoring of the application or a feature of the application (referred to herein as an "application feature" or "feature"). For instance, some application development teams will for these reasons use manual steps to define and track goals and mark production monitor values during a time period following an application release.

To address these issues, various embodiments described in more detail below provide a system and a method to enable determining of application change success ratings in an automated manner. In an example, a user-defined success criterion for an application change is received. In examples, the success criterion may be or include a count of user interactions, a count of resource consumption, a measure of application performance, feature performance, application availability, or feature availability.

The success criterion is provided to a computing system associated with a developer-user of the application. Evaluation code, for evaluating implementation of the change to the application or a feature of the application according to the success criterion, is received from the computing system. Responsive to receipt of a notice of production deployment of the change, the evaluation code is caused to execute. A success rating for the change is determined based upon application performance data attained via execution of the evaluation code.

In examples, the application performance data may be attained via execution of the evaluation code under prescribed traffic conditions, under prescribed geographic conditions, over a defined period, or over a prescribed number of iterations. In examples, the application performance data may be attained via execution of the evaluation code upon a schedule that prevents overlap of testing of the target success criterion or criteria relative to testing of other application performance criteria. In examples, the application change success rating may be provided to the development team via providing a dashboard graphic user interface, sending an email, or triggering a message in a development tool available to the development team.

In this manner, examples described herein may present an automated and efficient manner for application development teams to define quantitative goals for suggested application changes, and then track the achievement of these goals once the application change is delivered. Disclosed examples will enable stakeholders to define in user-centric terms a success criterion for an application change at the definition phase. Disclosed examples will enable production engineers to implement these criteria into an automated script to be executed in production and collect/evaluate data from production monitors. Disclosed examples will enable automation of execution of the script coupled with the application or application feature release and automation of the final reporting of the script execution results into the application or feature change system as feedback of application or application feature change success. Examples described herein may further detect where testing of applications or application features with success criteria may overlap with testing of other applications or features and/or test criteria, and integrate with the delivery pipeline to segment delivery of applications or features to avoid such overlaps. User satisfaction with development software programs and other development products and services that utilize the examples described herein should increase. Likewise, user satisfaction with the software programs developed utilizing the examples described herein, and with the computing devices upon which such software programs are executed or displayed, should increase.

The following description is broken into sections. The first, labeled "Environment," describes an environment in which various embodiments may be implemented. The second section, labeled "Components," describes examples of various physical and logical components for implementing various embodiments. The third section, labeled "Illustrative Example," presents an example of determining application change success ratings. The fourth section, labeled "Operation," describes steps taken to implement various embodiments.

Figure 1:
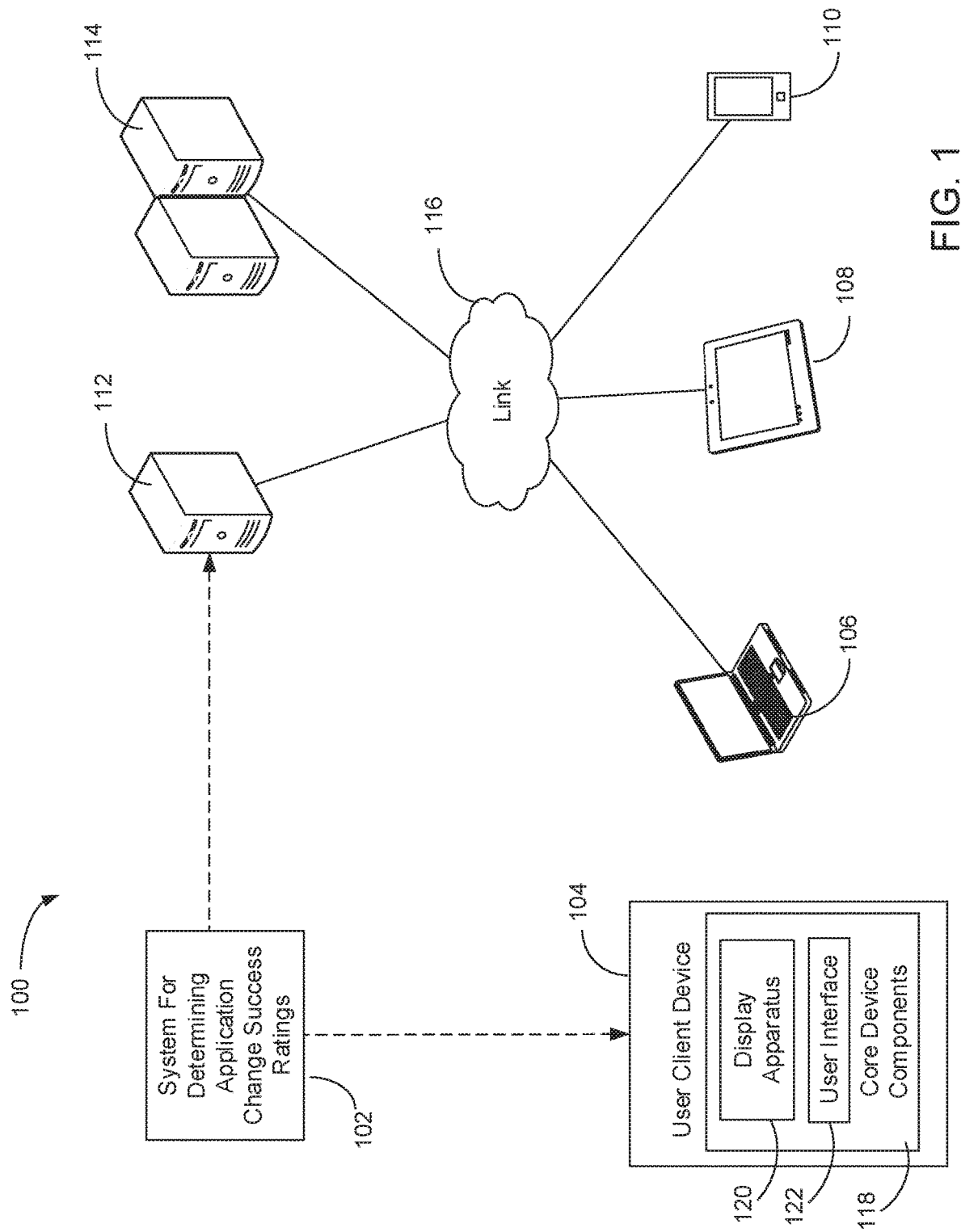
FIG. 1 is a block diagram depicting an example environment in which various embodiments may be implemented.

Environment:

FIG. 1 depicts an example environment 100 in which embodiments may be implemented as a system 102 to determine application change success ratings. Environment 100 is show to include computing device 104, client devices 106, 108, and 110, server device 112, and server devices 114. Components 104-114 are interconnected via link 116.

Link 116 represents generally any infrastructure or combination of infrastructures configured to enable an electronic connection, wireless connection, other connection, or combination thereof, to enable data communication between components 104 106 108 110 112 114. Such infrastructure or infrastructures may include, but are not limited to, one or more of a cable, wireless, fiber optic, or remote connections via telecommunication link, an infrared link, or a radio frequency link. For example, link 116 may represent the Internet, one or more intranets, and any intermediate routers, switches, and other interfaces. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Client devices 106-110 represent generally any computing device with which a user may interact to communicate with other client devices, server device 112, and/or server devices 114 via link 116. Server device 112 represent generally any computing device configured to serve an application and corresponding data for consumption by components 104-110. Server devices 114 represent generally a group of computing devices collectively configured to serve an application and corresponding data for consumption by components 104-110.

Computing device 104 represents generally any computing device with which a user may interact to communicate with client devices 106-110, server device 112, and/or server devices 114 via link 116. Computing device 104 is shown to include core device components 118. Core device components 118 represent generally the hardware and programming for providing the computing functions for which device 104 is designed. Such hardware can include a processor and memory, a display apparatus 120, and a user interface 122. The programming can include an operating system and applications. Display apparatus 120 represents generally any combination of hardware and programming configured to exhibit or present a message, image, view, or other presentation for perception by a user, and can include, but is not limited to, a visual, tactile or auditory display. In examples, the display apparatus 120 may be or include a monitor, a touchscreen, a projection device, a touch/sensory display device, or a speaker. User interface 122 represents generally any combination of hardware and programming configured to enable interaction between a user and device 104 such that the user may effect operation or control of device 104. In examples, user interface 122 may be, or include, a keyboard, keypad, or a mouse. In some examples, the functionality of display apparatus 120 and user interface 122 may be combined, as in the case of a touchscreen apparatus that may enable presentation of images at device 104, and that also may enable a user to operate or control functionality of device 104.

System 102, discussed in more detail below, represents generally a combination of hardware and programming configured to enable determination of application change success ratings. In an example, system 102 is to receive a user-defined success criterion for an application change, and to provide the success criterion to a computing system associated with a developer-user of the application. System 102 is to receive from the computing system evaluation code for evaluating implementation of the application change according to the success criterion. System 102 is to cause execution of the evaluation code responsive to receipt of a notice of production deployment of the application change. System 102 is to determine a success rating for the application change based upon application performance data attained via execution of the evaluation code receive.

In some examples, system 102 may be wholly integrated within core device components 118. In other examples, system 102 may be implemented as a component of any of computing device 104, client devices 106-110, server device 112, or server devices 114 where it may take action based in part on data received from core device components 118 via link 116. In other examples, system 102 may be distributed across computing device 104, and any of client devices 106-110, server device 112, or server devices 114. In a particular example, components that implement receiving a user-defined success criterion for an application change and providing the criterion to a computing system associated with a developer-user of the application may be included within a server device 112. Continuing with this particular example, components that implement receiving from the computing system evaluation code for evaluating implementation of the change according to the criterion, causing execution of the evaluation code responsive to receipt of a notice of production deployment of the change; and determining a success rating for the change based upon application performance data attained via execution of the evaluation code may be components included within computing device 104. Other distributions of system across computing device 104, client devices 106-110, server device 112, and server devices 114 are possible and contemplated by this disclosure. It is noted that all or portions of the system 102 to determine application change success ratings may also be included on client devices 106, 108 or 110.

Figure 2:
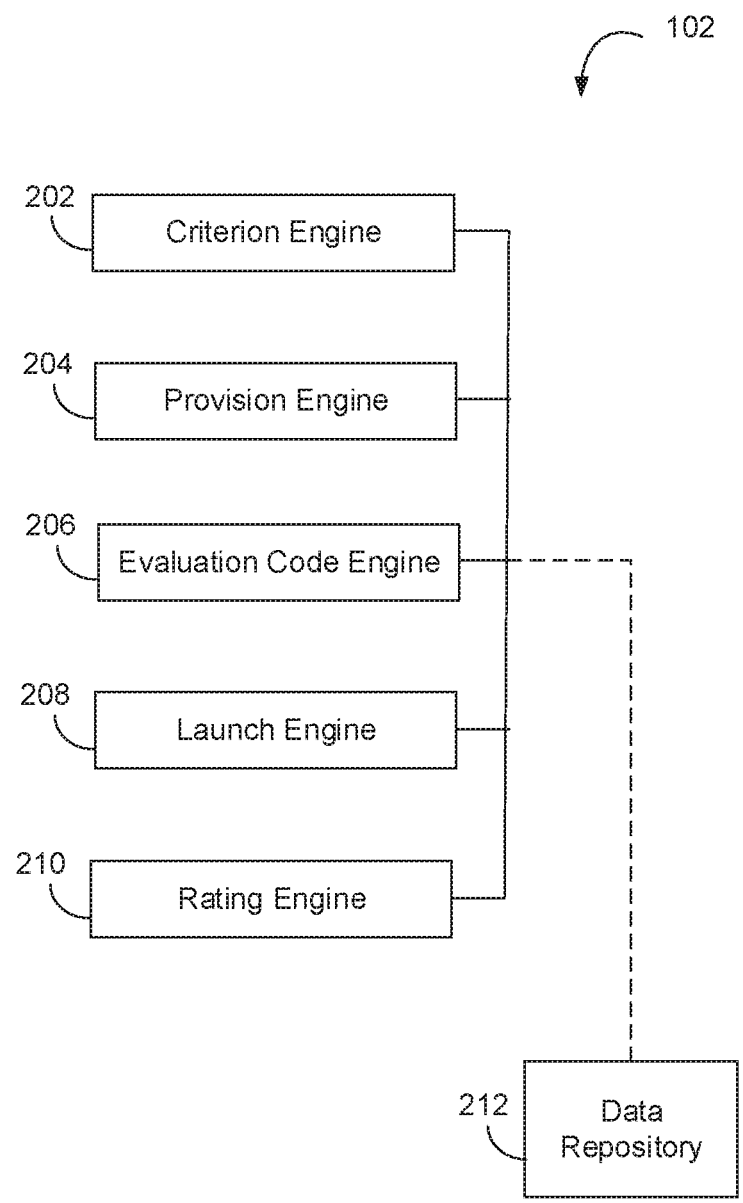
FIG. 2 is a block diagram depicting an example of a system to determine application change success ratings.
Figure 3:
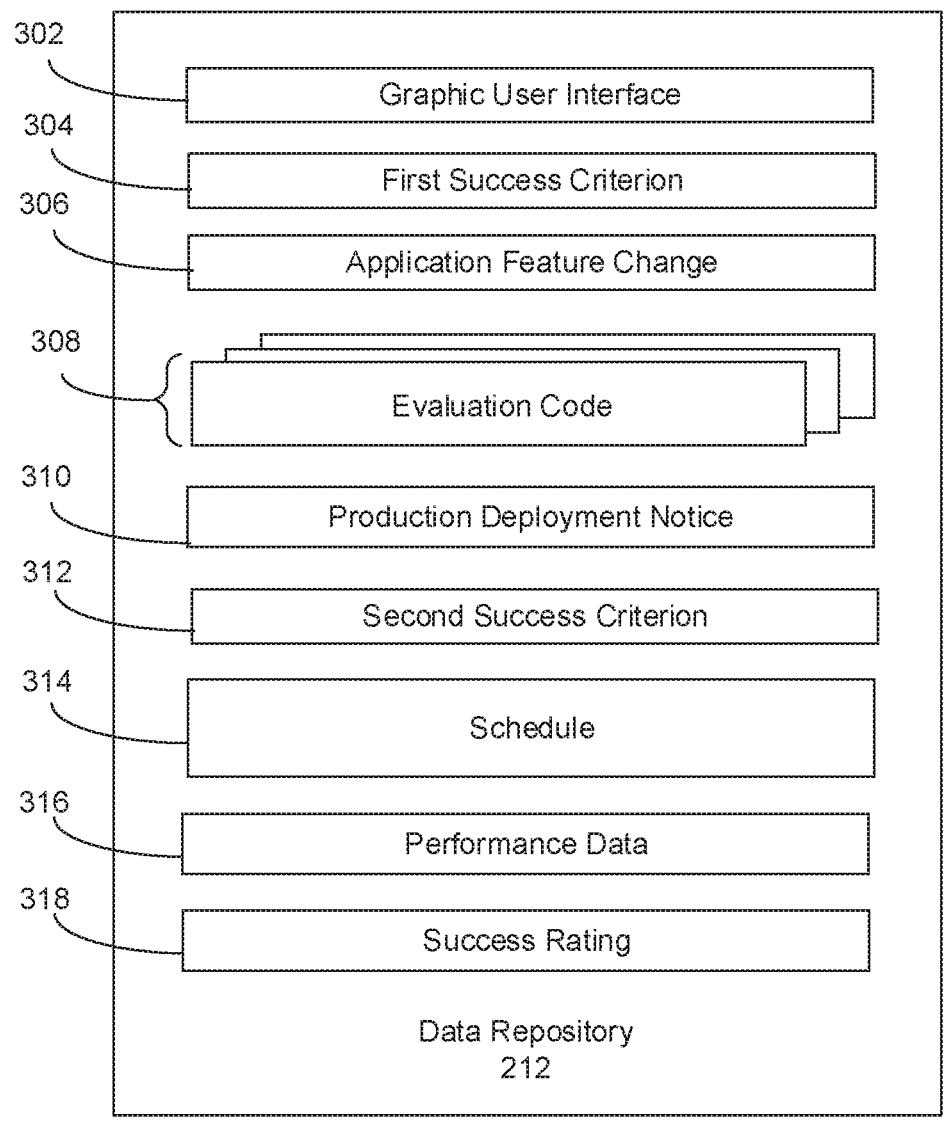
FIG. 3 is a block diagram depicting an example data structure for a system to determine application feature change success ratings.
Figure 4:
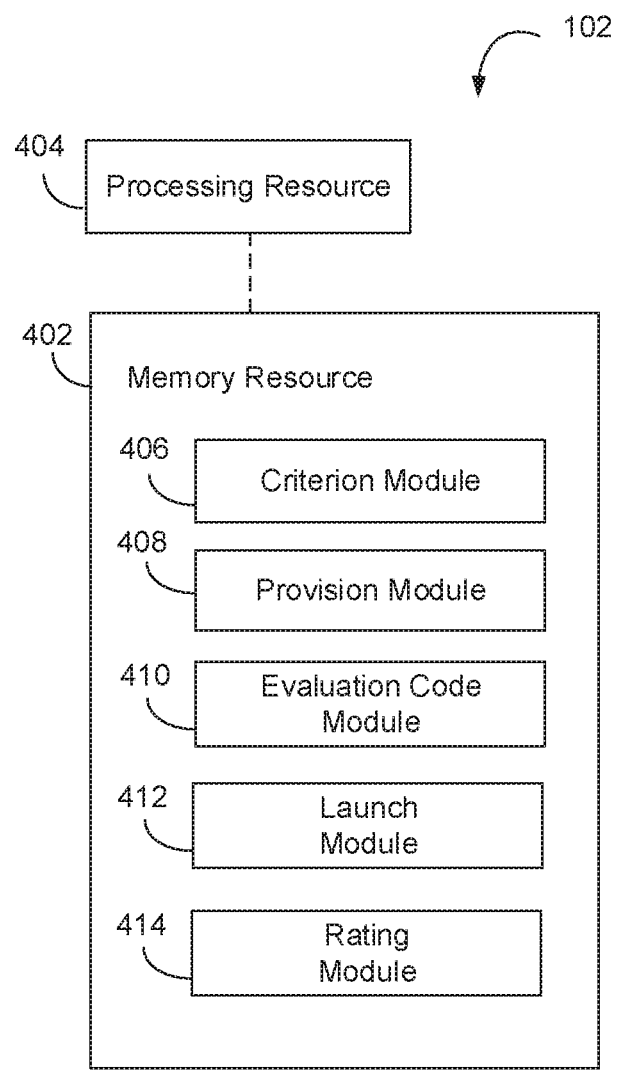
FIG. 4 is a block diagram depicting a memory resource and a processing resource according to an example.

Components:

FIGS. 2, 3, and 4 depict examples of physical and logical components for implementing various embodiments. In FIG. 2 various components are identified as engines 202 204 206 208 210. In describing engines 202 204 206 208 210 focus is on each engine's designated function. However; the term engine, as used herein, refers generally to a combination of hardware and programming configured to perform a designated function. As is illustrated later with respect to FIG. 4, the hardware of each engine, for example, may include one or both of a processor and a memory; while the programming may be code stored on that memory and executable by the processor to perform the designated function.

FIG. 2 is a block diagram depicting components of a system 102 to determine application change success ratings. In this example, system 102 includes criterion engine 202, provision engine 204, evaluation code engine 206, launch engine 208, and rating engine 210. In performing their respective functions; engines 202 204 206 208 210 may access data repository 212. Repository 212 represents generally any memory accessible to system 102 that can be used to store and retrieve data.

In an example, criterion engine 202 represents generally a combination of hardware and programming configured to receive a user-defined success criterion for a change made to a software application (an "application change"). As used herein, an "application" refers generally to a web application; software application, firmware application, or other programming that executes at, or accessible at, a computing device. In examples, an application change may be or include, but is not limited to, a change to code or programming for an application graphic user interface. In examples, an application change may be or include, but is not limited to, a change to code or programming for application elements or functionality other than an application graphic user interface, e.g., changes to how the application performs, or changes to how the application interacts with other applications, hardware, or systems. As used herein, a "success criterion" refers generally to any metric, measurement, benchmark, or other standard by which success of an application change or application feature change may be judged or decided. In examples the success criterion may be an accomplishment of a particular quantitative goal, or accomplishment of a particular quantitative goal over a designated period (e.g., discrete or continuous level of meeting a goal).

In examples the received user-defined success criterion is a criterion that is defined in user-centric terms. In examples, the user-defined success criterion is received as a Domain Specific Language (DSL) that is customizable and extendable by the system users. In examples, the criterion engine 202 is to provide, to a requirements-provider computing system associated with a requirements-provider user, a graphic user interface ("GUI") to be used by the user to input the success criterion, such that system 102 receives the success criterion via the GUI. As used herein, a graphic user interface, or "GUI", refers generally to any type of display caused by an application that can enable a user to interact with the application via visual properties of the display.

In examples the success criterion may be a criterion directly or indirectly linked to measurable user action, e.g., a count of user "mouse clicks", "mouse overs", "touch screen touches", or other user interactions with the GUI provided by the application during production execution. In another example, the success criterion may be a criterion directly or indirectly linked to a measurable user action with a hardware element (e.g., a keypad) at a computing device at which at which the application is being executed and/or displayed. Examples of success criteria linked to user actions include:

- a cumulative user click rate of 10,000 clicks at a GUI checkout feature of an application over a 24 hour period, measuring multiple executions or incidences of the application;
- a user click rate at a GUI checkout feature of an application improves 5% over 3 days; or
- a user activation of an MPEG-4 video feature of an application improves 5% over 3 days for a 100% goal, improves 2% over 3 days for a 50% goal, and improves 1% over 3 days for a 10% goal.

In other examples, the success criterion may be one that is not directly related to a measurable user interaction. In one example, the success criterion may be a count of resource consumption that occurs during execution of the application, e.g., memory consumption. In another example, the success criterion may be a measurement of the application's performance during execution, including but not limited to a measurement of CPU usage, physical memory usage, threads employed, network link speed, etc. In another example, the success criterion may be a measurement of the application's availability, e.g., up time relative to total time measured.

In examples, success criteria to be measured or evaluated may be bound by one or more conditions. Examples of conditions on measurement and/or analysis of success criteria include, but are not limited to time-bound conditions (e.g., user interactions or system attributes are to be measured or evaluated over a defined time window), traffic-bound conditions (e.g., user interactions or system attributes are to be measured or evaluated when the application is under prescribed network traffic conditions), geography-bound conditions (e.g., user interactions or system attributes are to be measured or evaluated with respect to computing devices or systems located in prescribed geographies).

Provision engine 204 represents generally a combination of hardware and programming configured to provide the success criterion to a developer-user computing system associated with a developer-user of the application. In an example, a production engineer team may observe the success criterion and implement the success criterion into evaluation code that, when executed is to evaluate implementation of an application change according to the success criterion.

Evaluation code engine 206 represents generally a combination of hardware and programming configured to receive evaluation code from the developer-user computing system. The evaluation code is computer code or programming that, when executed by a computer, will cause an evaluation of implementation of the application change according to the success criterion. In examples, the evaluation code can be received as source code or machine-readable code. In an example, the evaluation code is an automated script which when executed may access production monitors, and sample collected data at the production monitors at given time points.

In a particular example, the evaluation code may include instructions for executing a calculation to evaluate if a success criterion was met or not. For instance, in the following example of evaluation code (in pseudo-code), execution of the evaluation code would yield a result that is a 5% percentage increase in measured user interaction rate:

time X: let A=monitor(user interaction rate).value;
time X+3d: let B=monitor(user interaction rate).value;
result: eval(B % A==105%).

Launch engine 208 represents generally a combination of hardware and programming configured to receive a notice of a production deployment of the application change. As used herein, "production deployment" and "deployment in a production environment" refer generally to deployment of an application in a setting where the application is put into operation for its intended use by an end user or end users. In an example, a production environment refers to a setting where an application is executed and relied upon by users, e.g., for organization or commercial daily operations, as opposed to a test environment wherein an application is still being used theoretically.

Responsive to receipt of the deployment notice, launch engine 208 is to cause execution of the evaluation code that was received by the evaluation code engine. In an example, the evaluation code is to execute at a cloud server and collect data from production monitors and computing systems at which the application change is executed or displayed. In an example, launch engine 208 is to cause execution of the evaluation code over a defined period (e.g., 7 days, 24 hours, 30 work days, etc.) or a defined number of iterations.

Rating engine 210 represents generally a combination of hardware and programming configured to determine a success rating for the application change. The success rating is a rating based upon application performance data attained via execution of the evaluation code. As used herein, "performance data" refers generally to any data or information relating the execution, functioning, or performing of a software application or feature of an application. As used herein, a "success rating" refers generally to a classification, ranking, or value of success of the evaluated application change. In examples, a success rating may be or include a pass/fail rating, a not completed rating, a numerical score (e.g., 90%), or a letter grade (e.g., "A"). In examples, the success rating methodologies could be, but are not limited to "A" or "95%<=X<=100%"—the success criteria were evaluated and calculated to 95%<=X<=100% of a 100% success criterion target, so the application change was deemed very successful in delivering the expected value;

"Pass" or "75%<=X<=100%"—the success criteria were evaluated and calculated to 75%<=X<=100% of a 100% success criterion target, so the application change was satisfactory in delivering the expected value;

"Fail" or "X<=75%"—the success criteria were evaluated and calculated to "X<=75%" of a 100% success criterion target, so the application change was unsatisfactory in delivering the expected value;

"Not Completed"—execution of the evaluation code the evaluation code failed to render usable performance data.

In an example, rating engine 210 is to send the success rating to the requirements-provider computing system and/or the developer-user computing system, to notify stakeholders accessing such systems. In examples, rating engine 210 is to send the success rating to the requirements-provider computing system and/or a developer-user computing system via an integrated development application environment. In an example, rating engine 210 is to provide a dashboard GUI to the requirements-provider computing system, and/or the developer-user computing system, and send the determined success rating via the dashboard GUI. In another example, rating engine 210 is to send the determined success rating to the requirements-provider computing system and/or the developer-user computing system via an email communication. In yet another example, rating engine 210 is to send the determined success rating to the requirements-provider computing system and/or the developer-user computing system by triggering a message in a development tool application or application deployment automation tool accessible to a user or team of users at the requirements-provider computing system and/or the developer-user computing system.

In examples criterion engine 202 may receive the user-defined success criterion from the requirements-provider computing system, the provision engine 204 may provide the success criterion to the developer-user computing system, the evaluation code engine 206 may receive the evaluation code from the developer-user computing system, and/or the rating engine 210 may send the rating to the requirements-provider computing system and/or the developer-user computing system via a networking protocol. In examples, the networking protocol may include, but is not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP") and/or Session Initiation Protocol ("SIP").

FIG. 3 depicts an example implementation of data repository 212. In this example, data repository 212 includes graphic user interface ("GUI") 302, first success criterion 304, application feature change 306, evaluation code 308, production deployment notice 310, second success criterion 312, schedule 314, performance data 316, and success rating 318. Referring back to FIG. 3 in view of FIG. 2, in one example, criterion engine 202 (FIG. 2) sends, makes accessible, or otherwise provides (e.g., via link 116, FIG. 1) a graphic user interface 302 to a first computer system (e.g., server 112, FIG. 1) that is associated with a requirements-provider user. Criterion engine 202 receives, via the GUI, a user-defined and quantitative first success criterion 304 and a second success criterion 312 for an application feature change 306. A used herein, an "application feature change" refers generally to a modification to source code or machine code for a software application feature. A used herein, a "feature" or "application feature" refers generally to a specified functionality of an application that is a subset to total application functionality. In an example in which the application is a commercial web application, a feature may be, but is not limited to, a shopping cart/checkout feature, an instant messaging feature, a payment feature, an automatic reorder feature, or a product comparison feature.

Continuing with the example data repository 212 of FIG. 3 in view of FIG. 2, provision engine 204 sends to, makes accessible to, or otherwise provides (e.g., via link 116, FIG. 1) the first success criterion 304 to a second computing system (e.g., server system 114, FIG. 1) associated with a developer-user of the application.

Continuing with the example data repository 212 of FIG. 3 in view of FIG. 2, evaluation code engine 206, receives from the second computing system computer evaluation code 308 for evaluating implementation of the application feature change 306 according to the first success criterion 304. Launch engine 208 causes execution of the evaluation code 308 following receipt of a notice 310 of production deployment of the application feature change 306. In examples, launch engine 208 may validate that all criteria-bound conditions for execution of the evaluation code are being met. If launch engine 208 cannot execute the evaluation code 308 within the required conditions, the launch engine 208 may prevent execution of the evaluation code and send a notification to the second computing system.

Continuing with the example data repository 212 of FIG. 3 in view of FIG. 2, system 102 additionally is scheduled and configured to test a second success criterion 312 for the production deployment of the application feature change 306. Launch engine 208 may access a schedule 314 for testing or evaluation of the second success criterion 312 and cause execution of the evaluation code 308 for the first success criterion 304 based upon the schedule 314. This accessing of the testing schedule 314 is to prevent overlap of testing of the first and second success criteria 304 312. In an example, if an overlap in time between testing of the first and second success criteria 304 312 is found, the launch engine 208 may send a notification to the first and/or second computing system, such that users at the first and/or second computing system may proceed to prevent the overlap (e.g., by postponing or cancelling the testing of the first and/or second success criteria 304 312). In another example, if an overlap in time between testing of the first and second success criteria 304 312 is found, the launch engine 208 may proceed to prevent the overlap (e.g., by postponing or cancelling the testing of the first and/or second success criteria 304 312).

Continuing with the example data repository 212 of FIG. 3 in view of FIG. 2, rating engine 210 determines, and provides to the first or second computing system, a success rating 318 for the application feature change 306 based upon application performance data 316 captured via execution of the evaluation code 308. In examples, application performance data 316 that is utilized to determine the success rating 318 may be performance data that is directly or indirectly related to the application feature that was the subject of the application feature change 306.

In the foregoing discussion of FIGS. 2-3, engines 202 204 206 208 210 were described as combinations of hardware and programming. Engines 202 204 206 208 210 may be implemented in a number of fashions. Looking at FIG. 4 the programming may be processor executable instructions stored on a tangible memory resource 402 and the hardware may include a processing resource 404 for executing those instructions. Thus memory resource 402 can be said to store program instructions that when executed by processing resource 404 implement system 102 of FIGS. 1 and 2.

Memory resource 402 represents generally any number of memory components capable of storing instructions that can be executed by processing resource 404. Memory resource 402 is non-transitory in the sense that it does not encompass a transitory signal but instead is made up of more or more memory components configured to store the relevant instructions. Memory resource 402 may be implemented in a single device or distributed across devices. Likewise, processing resource 404 represents any number of processors capable of executing instructions stored by memory resource 402. Processing resource 404 may be integrated in a single device or distributed across devices. Further, memory resource 402 may be fully or partially integrated in the same device as processing resource 404, or it may be separate but accessible to that device and processing resource 404.

In one example, the program instructions can be part of an installation package that when installed can be executed by processing resource 404 to implement system 102. In this case, memory resource 402 may be a portable medium such as a CD, DVD, or flash drive or a memory maintained by a server from which the installation package can be downloaded and installed. In another example, the program instructions may be part of an application or applications already installed. Here, memory resource 402 can include integrated memory such as a hard drive, solid state drive, or the like.

In FIG. 4, the executable program instructions stored in memory resource 402 are depicted as criterion module 406, provision module 408, evaluation code module 410, launch module 412, and rating module 414. Criterion module 406 represents program instructions that when executed by processing resource 404 may perform any of the functionalities described above in relation to criterion engine 202 of FIG. 2. Provision module 408 represents program instructions that when executed by processing resource 404 may perform any of the functionalities described above in relation to provision engine 204 of FIG. 2. Evaluation code module 410 represents program instructions that when executed by processing resource 404 may perform any of the functionalities described above in relation to evaluation code engine 206 of FIG. 2. Launch module 412 represents program instructions that when executed by processing resource 404 may perform any of the functionalities described above in relation to launch engine 208 of FIG. 2. Rating module 414 represents program instructions that when executed by processing resource 404 may perform any of the functionalities described above in relation to rating engine 210 of FIG. 2.

Illustrative Example

FIGS. 5A-5C are screenshots illustrating an example of determining application feature change success ratings. Turning to FIG. 5A, in an example, system 102 (FIG. 1) provides, via a network 116 (FIG. 1) and to a first computing system that is associated with requirements-provider user, a first graphic user interface ("GUI") display 502 for receiving user-defined application feature success criteria. A requirements-provider user at the first computing system interacts with the first GUI to provide a first success criterion for a change made, or to be made, to a software application feature. In the example of FIGS. 5A-5C, the first success criterion is:

"more than 500 barcode searches each day for a week, starting one week after deployment."

System 102 receives the first success criterion for the application feature change, and in turn provides the success criterion to a second computing system associated with a developer-user of the application feature.

System 102 receives, via a network 116, from the second computing system a computer code script for evaluating implementation of the application feature change according to the received success criterion. FIG. 5B is a screenshot illustrating a second GUI display 504 of the received script 504. In examples, second GUI display 504 may occur at the first and/or second computing devices. System 102 launches execution of the evaluation code responsive to system 102 receiving notice that the application, including the application feature change, is executing in a production environment.

System 102 determines a success rating for the application feature change based upon performance data collected via execution of the evaluation code. Turning to FIG. 5C, system 102 provides, via a network 116 and to the first and/or second computing systems, a third GUI display 506 for displaying the determined success rating for the application feature change. In this example, the success rating for the application feature change is "Pass", as execution of the success criterion script revealed that the success criterion (more than 500 barcode searches each day for a week, starting one week after deployment) was met.

Operation:

FIG. 6 is a flow diagram of steps taken to implement a method for determining application change success ratings. In discussing FIG. 6, reference may be made to the components depicted in FIGS. 2 and 4. Such reference is made to provide contextual examples and not to limit the manner in which the method depicted by FIG. 6 may be implemented. A user-defined success criterion for an application change is received (block 602). Referring back to FIGS. 2 and 4, criterion engine 202 (FIG. 2) or criterion module 406 (FIG. 4), when executed by processing resource 404, may be responsible for implementing block 602.

The success criterion is provided to a computing system associated with a developer-user of the application (block 604). Referring back to FIGS. 2 and 4, provision engine 204 (FIG. 2) or provision module 408 (FIG. 4), when executed by processing resource 404, may be responsible for implementing block 604.

Evaluation code for evaluating implementation of the change according to the success criterion is received from the computing system (block 606). Referring back to FIGS. 2 and 4, evaluation code engine 206 (FIG. 2) or evaluation code module 410 (FIG. 4), when executed by processing resource 404, may be responsible for implementing block 606.

Execution of the evaluation code is caused responsive to receipt of a notice of production deployment of the change (block 608). Referring back to FIGS. 2 and 4, launch engine 208 (FIG. 2) or launch module 412 (FIG. 4), when executed by processing resource 404, may be responsible for implementing block 608.

A success rating for the change is determined. The success rating is based upon application performance data attained via execution of the evaluation code (block 610). Referring back to FIGS. 2 and 4, rating engine 210 (FIG. 2) or rating module 414 (FIG. 4), when executed by processing resource 404, may be responsible for implementing block 610.

CONCLUSION

FIGS. 1-6 aid in depicting the architecture, functionality, and operation of various embodiments. In particular, FIGS.

1-4 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s). Embodiments can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory" is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagram of FIG. 6 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims. All of the features disclosed in this specification (including any accompanying claims, abstract and drawings), and/or all of the steps of any method or process so disclosed, may be combined in any combination, except combinations where at least some of such features and/or steps are mutually exclusive.

What is claimed is:

1. A system, comprising:
    a processor; and
    a memory storing instructions that when executed cause the processor to:
    receive, from a first computing system, user-defined success criteria for an application change in an application, the user-defined success criteria including a first success criterion and a second success criterion;
    provide the success criteria to a second computing system associated with the application;
    subsequent to providing the success criteria to the second computing system, receive, from the second computing system, evaluation code for evaluating the application change according to the success criteria;
    accessing a schedule for an evaluation of the success criteria;
    responsive to receipt of a notice of production deployment of the application change, cause execution of the evaluation code based upon the schedule, wherein the execution of the evaluation code based on the schedule prevents overlap of testing of the first success criterion and the second success criterion and, in response to a determination of overlap of testing of the first success criterion and the second success criterion, cause a notification to be sent to the first computing system and/or the second computing system to postpone or cancel the testing of the first success criterion and/or the second success criterion; and
    determine a success rating for the application change based upon application performance data attained via the execution of the evaluation code and based upon the success criteria.

2. The system of claim 1, wherein the first computing system is associated with a requirements-provider user.

3. The system of claim 1, wherein the application change is a feature change and the application performance data is feature performance data.

4. The system of claim 1, wherein the success criteria comprises an accomplishment of a quantitative goal over a time period.

5. The system of claim 1, wherein the success criteria includes a count of user interactions, a count of resource consumption, a measurement of application performance, a measure of feature performance, a measure of application availability, and/or a measure of feature availability.

6. The system of claim 1, wherein the instructions cause the processor to execute the evaluation code over a defined time period or a number of iterations.

7. The system of claim 1, wherein the instructions cause the processor to send the success rating to the first or the second computing system via at least one of providing a dashboard graphic user interface, sending an email, or triggering a message in a development tool.

8. The system of claim 1, wherein the application performance data is attained via the execution of the evaluation code under prescribed network traffic conditions.

9. The system of claim 1, wherein the application performance data is attained via the execution of the evaluation code considering computing devices or systems distributed over prescribed geographies.

10. The system of claim 1, wherein the success rating for the application change is determined by a device that is different from the first computing system and the second computing system.

11. The system of claim 1, wherein the evaluation code includes instructions for executing a calculation to evaluate the application based on whether the success criteria is met.

12. The system of claim 1, wherein the first success criterion and the second success criterion are directly or indirectly linked to a measurable user action with a hardware device during execution of the application.

13. A memory resource storing instructions that when executed cause a processing resource to:
    receive, from a first computing system, user-defined and quantitative success criteria for an application feature change of an application, wherein the success criteria includes a first success criterion and a second success criterion;
    provide the success criteria to a second computing system associated with the application;
    receive, from the second computing system, evaluation code for evaluating the application feature change according to the success criteria;
    access a schedule for an evaluation of the success criteria;

cause an execution of the evaluation code based upon the schedule and in response to receipt of a notice of production deployment of the application feature change, wherein the execution of the evaluation code based on the schedule prevents overlap of testing of the success criteria;

in response to a determination of overlap of testing of the success criteria, cause a notification to be sent to the first computing system and/or the second computing system to postpone or cancel the testing of at least one of the success criteria; and determine and provide to the first or second computing system a success rating for the application feature change based upon application performance data captured via the execution of the evaluation code.

14. The memory resource of claim 13, wherein the application performance data is attained via the execution of the evaluation code over a defined time period or a number of iterations and under prescribed traffic conditions.

15. The memory resource of claim 13, wherein the success criteria includes at least one of a count of user interactions, a count of resource consumption, a measurement of application performance, a measure of feature performance, a measure of application availability, or a measure of feature availability.

16. The memory resource of claim 13, wherein the evaluation code includes instructions for executing a calculation to evaluate the application based on whether the success criteria is met.

17. A method to determine application feature change success ratings, comprising:

providing a graphic user interface to a first computing system;

receiving from the first computing system associated with a requirements-provider user, a success criteria for an application feature change of an application, the success criteria including a first success criterion and a second success criterion;

providing, by a processor, the success criteria to a second computing system associated with the application;

subsequent to providing the success criteria to the second computing system receiving, from the second computing system, evaluation code for evaluating the application feature change according to the success criteria, the evaluation code including instructions for executing a calculation to evaluate the application based on whether the success criteria is met;

accessing a schedule for an evaluation of the success criteria;

causing, by the processor, execution of the evaluation code based upon the schedule and in response to receipt of a notice of production deployment of the application feature change, wherein the execution of the evaluation code based on the schedule prevents overlap of testing of the success criteria and, in response to a determination of overlap of testing of the success criteria, cause a notification to be sent to the first computing system and/or the second computing system to postpone or cancel the testing of at least one of the success criteria; and determining, by the processor, a success rating for the application feature change based upon application feature performance data collected via the execution of the evaluation code.

18. The method of claim 17, wherein the success criteria includes at least one of a count of user interactions, a count of resource consumption, a measure of feature performance, or a measure of feature availability.

19. The method of claim 17, wherein the success criteria comprises an accomplishment of a quantitative goal over a time period.

20. The method of claim 17, wherein the success criteria includes at least one of a count of user interactions, a count of resource consumption, a measurement of application performance, a measure of feature performance, a measure of application availability, or a measure of feature availability.

* * * * *